United States Patent [19]

Foley et al.

[11] 4,044,721
[45] Aug. 30, 1977

[54] FISH TANK CONSTRUCTION

[76] Inventors: Charles F. Foley, 3908 Merriam Road, Minnetonka, Minn. 55343; Lewis J. Halberstadt, Conway Road, Williamsburg, Mass. 01060

[21] Appl. No.: 673,376

[22] Filed: Apr. 5, 1976

[51] Int. Cl.² .................................................. A01K 64/00
[52] U.S. Cl. ......................................................... 119/5
[58] Field of Search ............................................ 119/5, 3

[56] References Cited
U.S. PATENT DOCUMENTS

| | | | |
|---|---|---|---|
| 165,639 | 7/1875 | Wenmacker | 119/5 |
| 192,595 | 7/1877 | Palen et al. | 119/5 |
| 3,903,844 | 9/1975 | Greenia | 119/5 |

Primary Examiner—Hugh R. Chamblee
Attorney, Agent, or Firm—Dugger, Johnson & Westman

[57] ABSTRACT

A fish tank construction which is made with interior partitions through which fish can swim and which has "rooms" simulated as those normally inhabited by human beings as backdrops to provide a form of simulated house. The construction includes a fish cross-over whereby fish can swim in a "skyway" arrangement between adjacent tanks.

15 Claims, 3 Drawing Figures

FISH TANK CONSTRUCTION

BACKGROUND OF THE INVENTION

1. Field of the Invention

The present invention relates to constructions for fish tanks or aquariums whereby partitions are utilized for dividing the tank into a plurality of simulated rooms in combination with a simulated backdrop using interiors representing normal human habitat.

2. Prior Art

In the prior art, various fish tanks have been constructed using different types of backdrops. U.S. Pat. No. 192,595 issued July 3, 1877 shows a cross-over arch construction between two separated tanks, which arch is filled with water and which permits fish to swim between two tanks.

Backdrops are shown in U.S. Pat. No. 3,059,091 and 3,121,417. A fishing bridge is shown in U.S. Pat. No. 1,576,462 and a house exterior is shown in U.S. Pat. No. Des. 83,044. A TV front for an aquarium is shown in U.S. Pat. No. Des. 211,582. Partitions on the interior of tanks have also been known, but these generally keep fish separated into individual compartments as distinguished from the free access provided in this present device. For example, U.S. Pat. No. 3,255,731 shows interior partitions. Other patents that are of interest include U.S. Pat. No. Des. 160,125; 8,637, and U.S. Pat. No. 3,119,371; 2,512,678; 165,639; 2,646,021; and 164,074.

Also, commerically available devices known as "fish walk" are available.

SUMMARY OF THE INVENTION

The present invention relates to a unique aquarium construction providing for removal, replaceable, and easily assembled partitions which divide the aquarium into separated segments in accord with a simulated human habitat backdrop rooms, and which partitions are made so that they will permit ingress and egress of fish between each of the individual rooms formed.

In the construction shown, easily interlocked molded removable plastic partitions having large openings therein are provided. A horizontal partition has an opening that extends substantially the entire width (or length) of the aquarium, and upper and lower vertical partitions are snap locked into suitable retainers. The upper and lower partitions also have openings therethrough so that fish can swim between all the rooms simulated in the backdrop on the same floor level, and can also pass up and down between floors or levels. In this way, the fish can appear to be habitating a human house or home, or a school room, or other simulated human environment.

Additionally, the construction comprises the use of a removable or loose cross-over or bridge through which fish may swim, so that fish can pass from one "house" or building to another, both of which are normally associated with human habitat. For example, one aquarium may be designed as a school, and the other as a home, so that the fish will appear to be going to school and back home in the cross-over.

Other simulated backdrops simulating human habitat used, such as making the bridge a "skyway" as now are used for cross-over above streets in many cities in the northern portions of the United States, such as, for example in Minneapolis, Minnesota. Skyways are used for connecting a large number of different buildings.

The device is easily constructed, and is simple to assemble. It is also unique in its concept of providing individual segments in the aquarium simulating human habitat on a backdrop or overlay at the rear of the aquarium. The removable cross-over tube permits it to be cleaned and also permits the aquariums to be placed at angles relative to each other. The aquarium or tank may be placed in U-shapes or more than two may be connected by the cross-overs.

DESCRIPTION OF THE PREFERRED EMBODIMENTS

Figure 1:
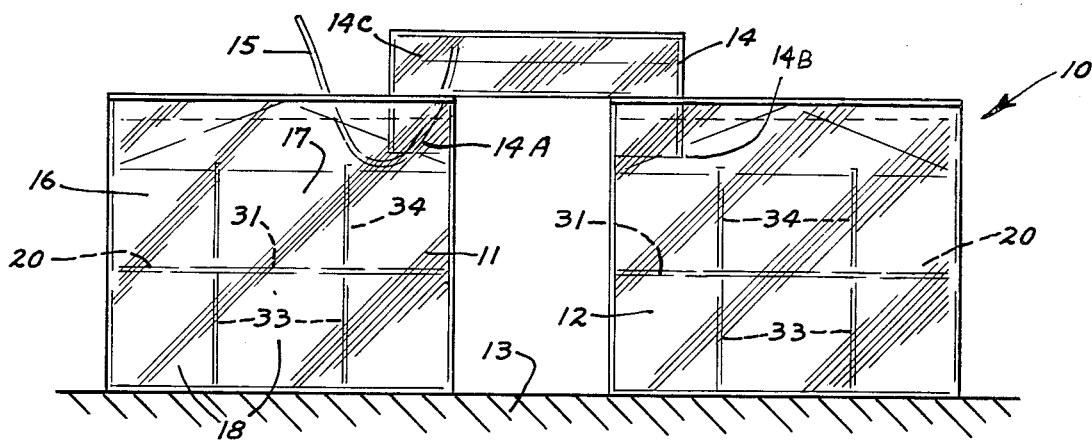
FIG. 1 is a side elevational view of a typical fish tank construction showing two fish tanks assembled in side by side relationship and utilized with a cross-over between the tanks.

Referring specifically to FIG. 1, the fish tank assembly illustrated generally at 10 includes a first aquarium 11, and a second aquarium 12 which are supported on a suitable support 13. The aquariums are not connected together in the sense that they may be individually positioned without affecting the position of the other aquarium. The aquariums are made up of individual upright end walls, side walls and a bottom wall to form a rectangular interior compartment as shown. The aquariums may be molded as one-piece open-topped units. The aquariums can be provided with covers, lights, or other suitable aquarium accessories.

A separable, rectangular, tubular, hollow skyway member illustrated generally at 14 is provided with a pair of downwardly depending legs 14A and 14B. One leg is positioned in each of the tanks 11 and 12, respectively. The legs 14A and 14B open to a top cross member 14C. The tubular legs have open bottoms at the bottom, but the tubular cross-over is otherwise closed or sealed.

When the aquariums are filled with water, and the legs 14A and 14B are installed, they are below the water level in the respective aquariums, and then a flexible tube 15 can be inserted up through the bottom of one of the legs, for example, leg 14A as shown, and the air removed either by way of a pump, or sucked out by a person, until the tube 14 fills with water, including the upper portion 14C. Once the air has been removed from the tube, the cross-over or skyway 14 will remain filled with water. The make up water can be added to one aquarium and siphon action will equalize the level of the water in the connected aquarium. Fish can then enter the lower openings in the bottom of legs 14A and 14B, and swim across the top of the skyway through the tubular member between the aquariums 11 and 12 in either direction. The width of the cross-over legs 14A and 14B is less than the interior width of the aquarium by a sufficient amount to permit the aquarium to be placed at an angle without binding.

In the present construction, the aquariums 11 and 12 are provided with backdrops, comprising pictures or representations of human habitat on the outside of the far (back) wall as shown. For example, the aquarium 11 may be divided into individual school rooms, or class rooms as indicated at 16, and 17. The "building" includes upper and lower levels. There is a lower level 18 as well as an upper level. The partitions indicated generally at 20 are used for dividing the interior of the aquarium into compartments. The compartment division lines are along, generally, the division lines or walls between individual rooms simulated on the backdrop, although the rooms can be of different sizes if desired.

Figure 2:
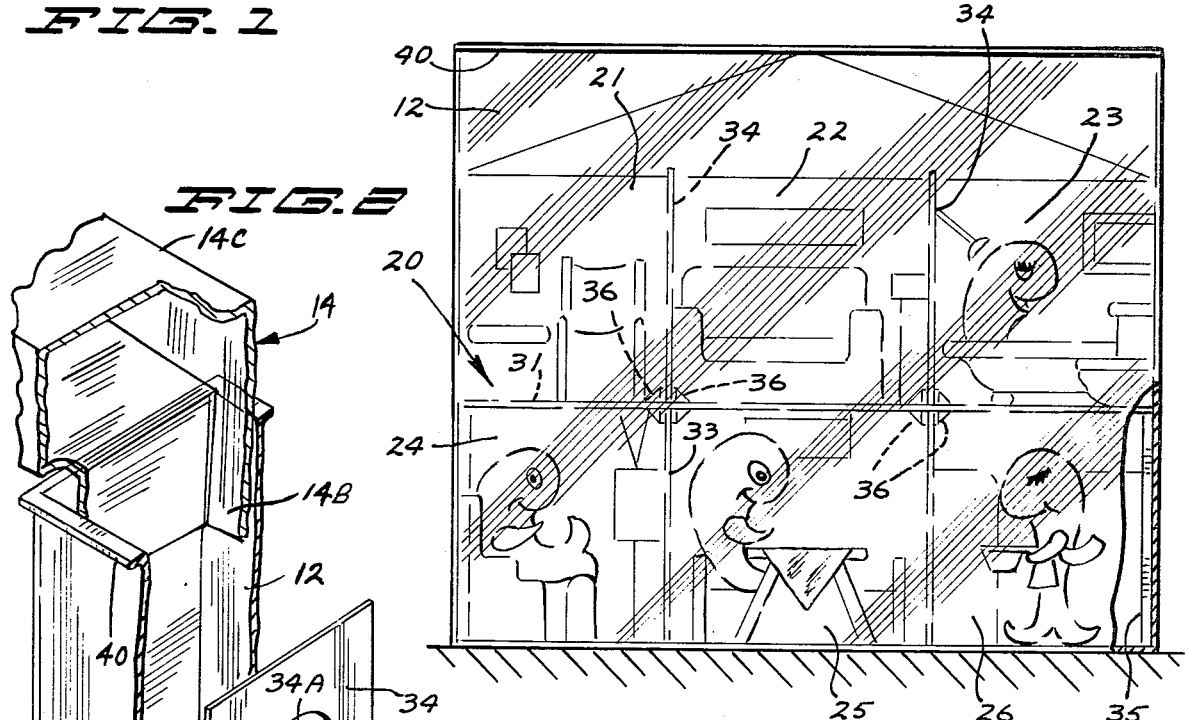
FIG. 2 is an enlarged front elevational view of one of the tanks shown in FIG. 1.
Figure 3:
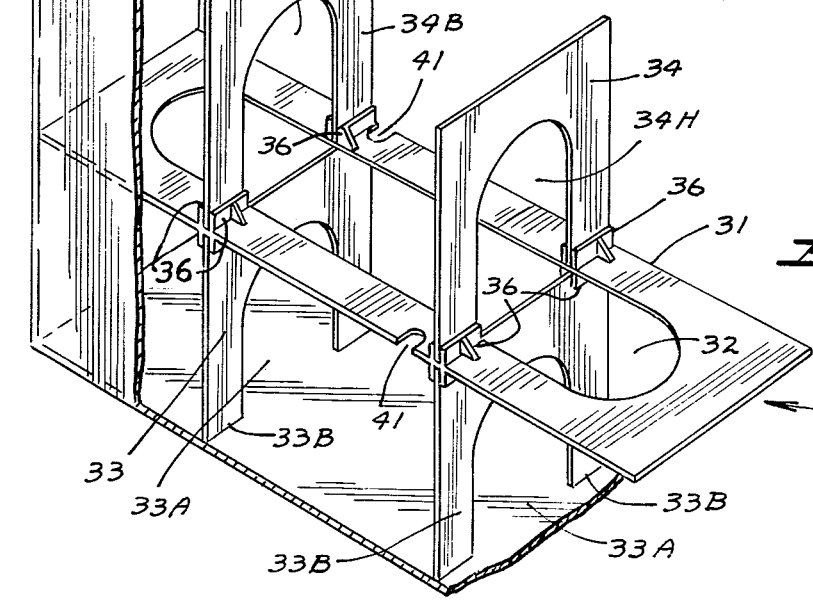
FIG. 3 is a perspective view of the interior partitions used in the tank shown in FIG. 2.

Referring now specifically to FIG. 2 for a more full understanding of the invention, the backdrop representation is shown through the transparent wall of the aquarium 12, and in this instance represents a home, with a plurality of rooms, for example, a bedroom 21, a living room 22, and bathroom 23, a TV room 24, a dining room 25 and a kitchen 26.

The representations of fish shown in the backdrop indicate fish engaged in normal human activities that go along with the theme of the room. The backdrop is provided with divider walls corresponding to the use of the partitions which are shown generally at 20.

These partitions, as shown, specifically include a horizontal partition 31, which divides the aquarium into upper and lower stories or levels, as shown. This partition 31 is of size to slip within the rectangular aquarium with a small clearance, and as shown has an elongated central slot or opening 32 comprising a passage through the center portions of the partition 31. The slot or opening 32 extends substantially the entire length of the partition, and overlaps into all of the rooms in both the upper and lower levels of the backdrop. The partition 31 can be supported on vertical partitions 33, which are positioned below the partition 31, and in turn top vertical partitions 34 can be used as well. In addition, a small rib 35 can be provided at each of the end walls of the aquarium as shown fragmentarily in FIG. 2 so that the horizontal partition 31 can be supported on the upper ends of these ribs without any vertical partitions 33 in place below it.

The vertical partitions 33 and 34 are identically constructed, and comprise generally flat wall-like members having U shaped openings 33A and 34A defined therein respectively. A pair of legs 33B and 34B respectively are formed on the vertical partition, which straddle the opening 32 in the partition 31. The partitions are of thickness to each frictionally fit between separate pairs of ears 36, which are provided at the top and bottom surfaces of the partition 31. The ears are arranged in closely spaced pairs so that the partitions 33 and 34 will be gripped in these ears and held securely when assembled. As shown, the partitions 34 are mounted so that each of the legs 34B fit within a pair of ears 36, and for the lower partitions 33, the upper edge of the partition will fit between two pairs of ears 36 on the lower side of the partition 31.

Also as shown, the side walls of the aquariums can include an outwardly extending lip or leg indicated generally at 40, for reinforcement of the molded plastic side walls. The use of the top flange lends strength without greatly increasing weight. The use of reinforcing lip makes the molded tanks feasible.

It can be seen that the egress and ingress between the individual rooms by the fish is very easy, and the openings 33A and 34A permit the fish to swim horizontally between rooms, while the opening 32 in the horizontal partition 31 permits the fish to swim up and down. In this manner, the fish simulate moving between normally human habitat rooms with ease, and the partitions are aligned to divide the aquarium into rooms in accordance with the backdrop representing the human habitat.

Thus by coordinating the partitions, and the backdrop, a much more realistic simulation is made than in previous devices, and the individual partitions, and the means of attaching the partitions together, greatly increases the ease with which the unit can be assembled.

If the aquarium is to be used with a pump or something that requires tubes or hoses to pass through the horizontal partition, slots indicated generally at 41 are provided on the opposite sides of the horizontal partition, adjacent the edges so that air hoses can be placed through these slots to pass down to the lower level if desired.

The aquariums in the unit can be placed at angles relative to each other, or in different arrangements if desired. More than two aquariums can be connected together by the use of a different, additional skyway. The filling of the skyways is very easy, and if the unit is to be emptied, all that has to be done is to reduce the water level in one of the aquariums to a level so that the water will flow out of the skyway. The partitions can easily be washed and cleaned, and they are also easy to remove and replace. It should be noted that fish can be trained to feed in one section of the tank, for example in the dining room only, to further enhance the use of the partitions, and the backdrop to simulate human habitat environments. The partitions, particularly the vertical partitions, are easily removed so the rooms may be made of different size to coincide with different sized rooms on a backdrop. The opening in the vertical partitions extend all the way to the floor of the aquarium to permit easier cleaning of the lower wall without removing the partitions. Changing the water level in one tank and causing a flow between tanks will flush sediment from the cross-over as the levels again equalize.

The vertical partitions should be no taller than the rooms depicted, and the partitions should be at or near the water level. The end of the cross-over should be below the water level, of course and above the horizontal partitions. The fish then cannot swim from the cross-over directly over the top of a vertical partition.

The outlet from any air pump must be kept away from the area below the cross-over. Failure to do this will result in air filling the cross-over tube. The notches 41 used for positioning the air hose are thus near the center of the aquarium.

The tank interior partitions also are made to align with room dividers shown in the artwork so that the rooms are easily visualized.

It is also to be understood that the cross-over has a backdrop or artwork panel to simulate the presently used skyways between buildings or other human habitats.

What is claimed is:

1. In aquarium construction comprising a tank defining an interior compartment having a generally transparent front wall and a rear wall spaced from the front wall, means on the rear wall forming a visable backdrop simulating a cross section of an interior of a building including rooms normally inhabited by humans and including representations of wall dividers between the rooms, and a plurality of removable wall dividers extending between the front and rear walls of said aquarium and having edges generally aligning with the representations of wall dividers of the backdrop, said removable wall dividers having substantial unobstructed openings therethrough to permit fish passage through all of the removable wall dividers.

2. The aquarium of claim 1 wherein said removable wall dividers include a horizontal divider dividing the aquarium into upper and lower levels.

3. The aquarium of claim 2 wherein said removable wall dividers include a plurality of generally vertical dividers engaging and extending from said horizontal divider, said horizontal divider having a continuous opening defined therein of size to extend laterally past all of said vertical dividers.

4. The aquarium of claim 3 wherein some of said vertical dividers are positioned above said horizontal divider and some of vertical dividers are positioned below said horizontal divider.

5. The aquarium of claim 1 wherein said aquarium includes end walls joining said front and rear walls and removable wall dividers include a horizontal divider and a plurality of vertical dividers, grip means on the horizontal divider to frictionally receive and retain edge portions of the vertical dividers.

6. The aquarium of claim 5 wherein said horizontal divider has a continuous opening therethrough extending in direction between the end walls a sufficient distance to overlap all of the vertical dividers.

7. The aquarium of claim 6 wherein said vertical dividers have generally V-shaped openings defined therein extending upwardly from the lower edge.

8. The aquarium of claim 5 wherein said horizontal divider extends substantially the entire distance between the front and rear walls, and at least one notch defined through the edge portion of said horizontal divider adjacent one of said front and rear walls of size for passage of an air tube.

9. The aquarium of claim 2, and boss means molded as part of at least some of the walls of said aquarium and providing an upwardly facing surface positioned to engage and support a horizontal divider spaced from a bottom of said aquarium.

10. A combination of two aquariums as defined in claim 1 positioned adjacent to each other and being unsecured with respect to each other, and a tubular member having downwardly projecting end portions and a center portion joining said end portions, each of said downwardly projecting portions being unsecuredly positioned in a different one of said aquariums, said tubular members being filled with water to provide a passageway between the aquariums.

11. The combination of claim 10 wherein said center portion of said tubular member has a front and rear generally planar walls, said front wall of the tubular member being generally transparent, and means on the rear wall of the tubular member forming a visible backdrop representation associated with human habitat thereon.

12. The combination of claim 10 wherein said tubular member has a generally rectilinear cross section and said end portions extend generally vertically down from the center portion, said center portion being generally horizontal when positioned on two aquariums.

13. An aquarium construction for fish including a transparent walled tank, a representation of a cross section of an interior of a building having a plurality of rooms normally inhabited by humans on one wall of the tank facing an opposite generally parallel wall visible through the opposite wall, and removable divider panels between the one wall and the opposite wall aligning with the divisions between rooms on the representation including a horizontal divider panel between the two stories of the representation, each of said dividers having an opening defined therethrough of sufficient size to permit fish in the aquarium to pass therethrough.

14. A fish tank defining an interior compartment having a generally transparent front wall and a rear wall spaced from the front wall and side walls joining said front and rear walls, means on one of the front and rear walls forming a visible backdrop simulating a cross section of an interior of a building including a plurality of individual rooms normally inhabited by humans, and a plurality of removable wall dividers extending between the front and rear walls of said aquarium and having edges generally aligning with the divisions between adjacent rooms on the backdrop, at least some of said removable wall dividers having substantial unobstructed openings therethrough to permit fish passage through the removable wall dividers to permit access to all of the rooms.

15. The aquarium of claim 14 wherein said removable wall dividers includes a horizontal divider dividing the aquarium into upper and lower levels, a plurality of generally vertical dividers engaging and extending from said horizontal divider, said horizontal divider having a continuous opening defined therein of size to extend laterally past all of said vertical dividers.

* * * * *